Patented July 19, 1927.

1,636,656

UNITED STATES PATENT OFFICE.

JAMES V. CAPICOTTO, OF BROOKLYN, NEW YORK, ASSIGNOR TO DUBILIER CONDENSER CORPORATION, OF NEW YORK, N. Y., A CORPORATION OF DELAWARE.

WELDING COPPER AND ALUMINUM.

No Drawing. Application filed June 10, 1924. Serial No. 719,119.

My invention relates to a method of uniting copper and aluminum and has for its chief object to provide for joining those two metals by a simple and inexpensive proceeding that does not require complicated apparatus.

A further object of this invention is to provide a method of affixing copper to aluminum by welding; which is accomplished by first coating one of the metals with a suitable medium, and then welding in spots, with the result that a permanent junction is obtained.

Other objects and advantages will be apparent from the following description, and the right is reserved to change the details herein set forth without departing from the scope and spirit of the invention, as defined in the appended claim.

In practice, I first impart to the surface of the copper a coating medium, such as ordinary solder, which may be of tin, or some mixture of tin and lead or other ingredients suited, for example, to the usual operations of the tinsmith. Such solder, as is well known, will not adhere to aluminum, and will not take effect, when treated with a soldering iron, to hold aluminum and another metal together. According to my invention, however, the solder plays an important part, because if the aluminum be placed in contact with the coated copper, welding can be accomplished; while in the absence of the coating welding is impossible.

With the two metals in contact, then the aluminum and copper are subjected to the action of an ordinary spot-welding device. This step in the method is performed by taking a piece of aluminum and laying it upon the coated surface of the copper and then causing the two points or electrodes of the welding device to strike repeatedly upon the opposite surfaces of the overlapping metals. As the current of the welding device flows through the two metals and the coating on the copper, it fuses the two metals together and makes a very efficient joint. Without the coating of solder on the copper, no welding action can be obtained.

My invention thus achieves the union of the copper and aluminum without requiring special apparatus or appliances which are difficult or expensive to handle.

Having described my invention what I believe to be new and desire to secure and protect by Letters Patent of the United States is:—

The method of uniting copper and aluminum, which consists in coating the copper with solder, bringing the aluminum in contact with the coated copper and then spot welding the parts of the two metals in contact with each other, to join them together.

In testimony whereof I affix my signature.

JAMES V. CAPICOTTO.